(12) United States Patent
Ren et al.

(10) Patent No.: US 10,005,031 B2
(45) Date of Patent: Jun. 26, 2018

(54) DUAL-LAYER CATALYST

(71) Applicant: GM GLOBAL TECHNOLOGY OPERATIONS LLC, Detroit, MI (US)

(72) Inventors: Shouxian Ren, Rochester Hills, MI (US); Se H. Oh, Troy, MI (US); Yong Miao, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 14/962,531

(22) Filed: Dec. 8, 2015

(65) Prior Publication Data

US 2017/0157564 A1 Jun. 8, 2017

(51) Int. Cl.
*F01N 3/10* (2006.01)
*B01D 53/94* (2006.01)
(Continued)

(52) U.S. Cl.
CPC .......... *B01D 53/9477* (2013.01); *B01J 23/22* (2013.01); *B01J 23/28* (2013.01); *B01J 23/30* (2013.01); *B01J 23/50* (2013.01); *B01J 23/63* (2013.01); *B01J 29/068* (2013.01); *B01J 29/072* (2013.01); *B01J 29/076* (2013.01); *B01J 35/0006* (2013.01); *B01J 37/0244* (2013.01); *B01D 2255/104* (2013.01); *B01D 2255/1023* (2013.01); *B01D 2255/2065* (2013.01); *B01D 2255/2073* (2013.01); *B01D 2255/2092* (2013.01); *B01D 2255/20707* (2013.01); *B01D 2255/20715* (2013.01);
(Continued)

(58) Field of Classification Search
CPC .......... B01J 23/28; B01J 23/50; B01J 29/076; B01D 2255/1023
USPC .................... 422/171, 177; 60/274, 276, 286
See application file for complete search history.

(56) References Cited

U.S. PATENT DOCUMENTS 7,964,167 B2 6/2011 Kim et al.
8,057,767 B1 11/2011 Qi et al.
(Continued)

FOREIGN PATENT DOCUMENTS

DE 102016123565 A1 6/2017

*Primary Examiner* — Tom P Duong
(74) *Attorney, Agent, or Firm* — Harness, Dickey & Pierce, P.L.C.

(57) ABSTRACT

A dual-layer catalyst includes a substrate, a first layer disposed on the substrate, and a second layer disposed on the first layer. The first layer includes a first catalyst for storing $NO_x$ when the first catalyst has a temperature below an active temperature of a second catalyst. The first catalyst is to release the stored $NO_x$ when the first catalyst is heated to the active temperature of the second catalyst. The second layer includes the second catalyst for ammonia Selective Catalytic Reduction of the released $NO_x$. The dual-layer catalyst is to be included in a catalytic converter and a catalyst system for reducing $NO_x$ emissions from a diesel engine, the $NO_x$ emissions including $NO_x$ emitted during a predetermined cold-start time period.

17 Claims, 4 Drawing Sheets

(51) Int. Cl.
  *B01J 23/22* (2006.01)
  *B01J 23/28* (2006.01)
  *B01J 23/30* (2006.01)
  *B01J 23/50* (2006.01)
  *B01J 23/63* (2006.01)
  *B01J 29/068* (2006.01)
  *B01J 29/072* (2006.01)
  *B01J 29/076* (2006.01)
  *B01J 35/00* (2006.01)
  *B01J 37/02* (2006.01)

(52) U.S. Cl.
  CPC .............. *B01D 2255/20723* (2013.01); *B01D 2255/20738* (2013.01); *B01D 2255/20761* (2013.01); *B01D 2255/20769* (2013.01); *B01D 2255/20776* (2013.01); *B01D 2255/20784* (2013.01); *B01D 2255/30* (2013.01); *B01D 2255/50* (2013.01); *B01D 2255/9022* (2013.01)

(56) References Cited

U.S. PATENT DOCUMENTS

| | | | |
|---|---|---|---|
| 8,226,915 B2 | 7/2012 | Qi et al. | |
| 8,268,274 B2 | 9/2012 | Kim et al. | |
| 8,318,119 B2 | 11/2012 | Qi et al. | |
| 8,343,888 B2 | 1/2013 | Kim et al. | |
| 8,377,400 B2 | 2/2013 | Schmieg et al. | |
| 8,466,083 B2 | 6/2013 | Schmieg et al. | |
| 8,539,760 B2 | 9/2013 | Li et al. | |
| 8,545,779 B2 | 10/2013 | Blint et al. | |
| 8,857,154 B2 | 10/2014 | Mehta | |
| 8,959,894 B2 | 2/2015 | Qi et al. | |
| 9,186,654 B2 | 11/2015 | Qi et al. | |
| 9,597,635 B2 | 3/2017 | Qi et al. | |
| 2006/0034741 A1* | 2/2006 | Li | B01D 53/9422 423/213.5 |
| 2006/0162323 A1* | 7/2006 | Hammerle | F01N 3/0222 60/297 |
| 2007/0144153 A1* | 6/2007 | Gandhi | B01D 53/8631 60/286 |
| 2009/0173064 A1* | 7/2009 | Ren | F01N 3/0821 60/299 |
| 2010/0229533 A1 | 9/2010 | Li et al. | |
| 2010/0233045 A1 | 9/2010 | Kim et al. | |
| 2011/0005204 A1* | 1/2011 | Bandl-Konrad | B01D 53/9431 60/276 |
| 2012/0036834 A1 | 2/2012 | Qi et al. | |
| 2012/0042631 A1 | 2/2012 | Schmieg et al. | |
| 2012/0159927 A1 | 6/2012 | Li et al. | |
| 2012/0159935 A1 | 6/2012 | Li et al. | |
| 2013/0294989 A1 | 11/2013 | Koch et al. | |
| 2013/0294990 A1 | 11/2013 | Koch et al. | |
| 2014/0349840 A1* | 11/2014 | Han | B01D 53/9436 502/74 |
| 2015/0361913 A1 | 12/2015 | Qi et al. | |
| 2016/0123945 A1 | 5/2016 | Qi et al. | |
| 2016/0222852 A1 | 8/2016 | Ren et al. | |

* cited by examiner

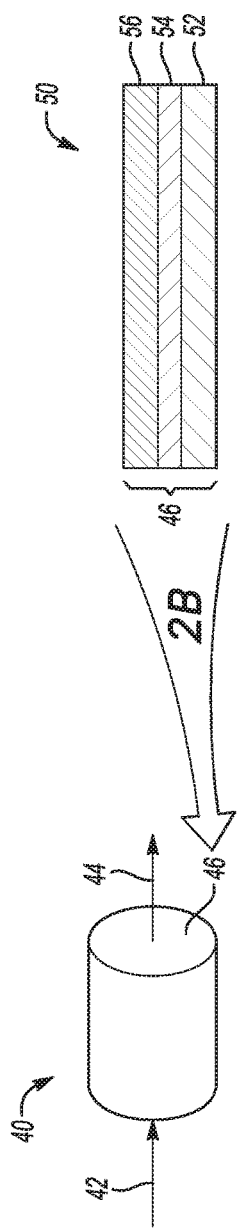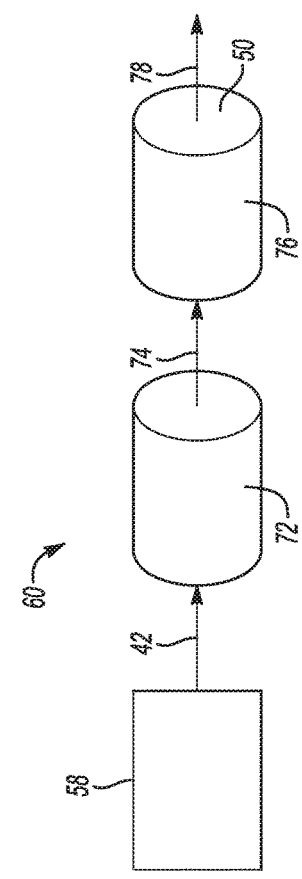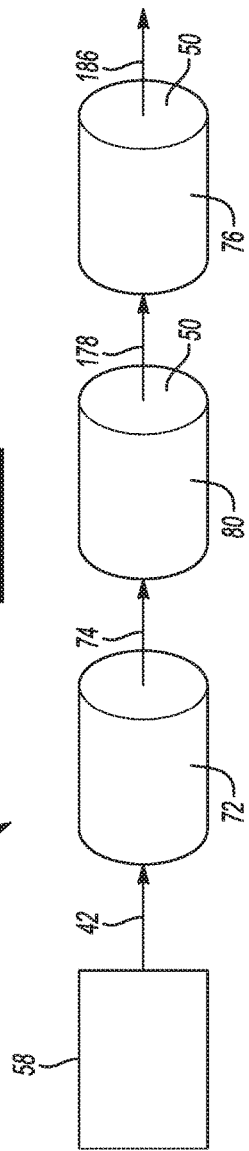

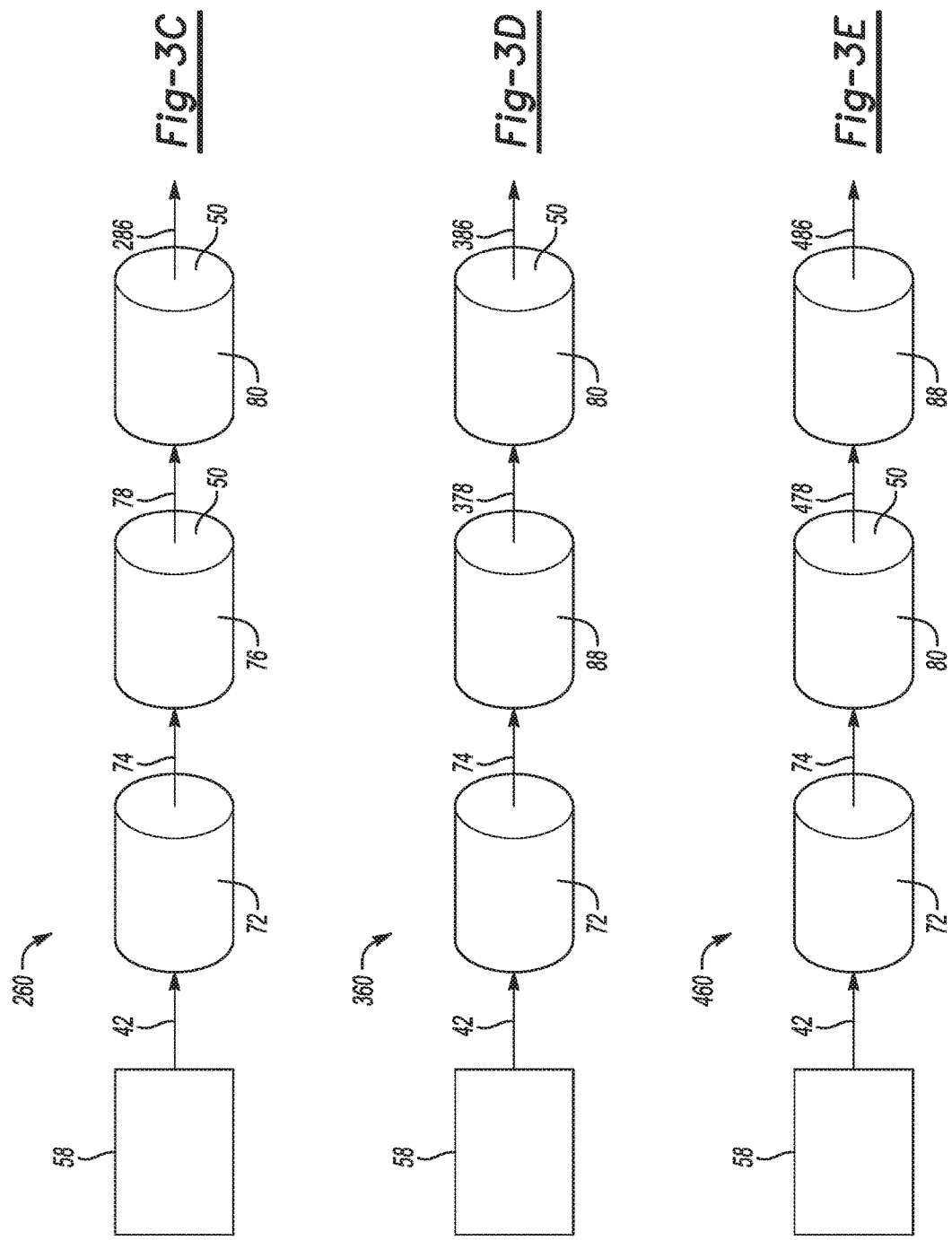

DUAL-LAYER CATALYST

TECHNICAL FIELD

The present disclosure relates generally to reducing diesel $NO_x$.

BACKGROUND

Some existing vehicles have exhaust gas aftertreatment systems to reduce the amounts of carbon monoxide, unburned hydrocarbons, and nitrogen oxides (collectively, $NO_x$) that are discharged to the atmosphere in the exhaust from internal combustion engines that power the vehicles. Existing exhaust gas aftertreatment systems may be most effective in treating the exhaust from a warmed-up engine because the catalyst materials have been heated to temperatures (e.g., 200° C. and above) at which the catalyst materials serve to effectively oxidize carbon monoxide and incompletely burned fuel constituents to carbon dioxide and water, and to reduce nitrogen oxides to nitrogen gas. The existing exhaust gas aftertreatment systems have been effective for both gasoline engines operating at or around the stoichiometric air-to-fuel ratio and diesel engines (and other lean-burn engines) operating with excess air (sometimes called "lean burn" engines).

It has been difficult to treat exhaust emissions immediately following a cold engine start, before the exhaust has heated the catalytic converter or converters to the effective temperatures for designated catalytic reactions. Lean-burn engines, such as diesel engines, tend to produce cooler exhaust streams because of the excess air used in the combustion mixtures charged to their cylinders. Untreated cold-start emissions may make-up a significant portion of the total regulated emissions at a tailpipe of a vehicle. Mixed nitrogen oxides in the exhaust of diesel engines have been difficult to reduce. These nitrogen oxides include nitric oxide (NO) and nitrogen dioxide ($NO_2$); the mixture may be typically referred to as $NO_x$. There is, therefore, a need for better systems for treating the exhaust gas from an engine following a cold-start.

SUMMARY

A dual-layer catalyst includes a substrate, a first layer disposed on the substrate and a second layer disposed on the first layer. The first layer includes a first catalyst to store $NO_x$ when the first catalyst has a temperature below an active temperature of a second catalyst, the first catalyst to release the stored $NO_x$ when the first catalyst is heated to the active temperature of the second catalyst. The second layer includes the second catalyst for ammonia Selective Catalytic Reduction of the released $NO_x$. The dual-layer catalyst is to be included in a catalytic converter for reducing $NO_x$ emissions from a diesel engine, the $NO_x$ emissions including $NO_x$ emitted during a predetermined cold-start time period.

BRIEF DESCRIPTION OF THE DRAWINGS

Features of examples of the present disclosure will become apparent by reference to the following detailed description and drawings, in which like reference characters correspond to similar, though perhaps not identical, components. For the sake of brevity, reference characters or features having a previously described function may or may not be described in connection with other drawings in which they appear.

FIG. 2A is a schematic diagram of an example of a catalytic converter having a dual-layer catalyst according to the present disclosure, useful in conjunction with a diesel aftertreatment system;

FIG. 2B is a schematic cross sectional view depicting a detailed portion of FIG. 2A, showing example layers of the dual-layer catalyst according to the present disclosure;

FIG. 3A is a schematic diagram depicting an example of a diesel aftertreatment system having a catalytic converter including an example of the dual-layer catalyst, according to the present disclosure;

FIGS. 3B-3E depict further examples of diesel aftertreatment systems having at least one catalytic converter that includes an example of the dual-layer catalyst according to the present disclosure.

DETAILED DESCRIPTION

Selective Catalytic Reduction (SCR) of $NO_x$ using ammonia ($NH_3$) as a reductant is used to reduce $NO_x$ emissions from diesel engines that power existing vehicles and stationary machines. In the existing SCR process, $NO_x$ reacts with a reductant, such as pure anhydrous ammonia, aqueous ammonia, and/or ammonia generated by urea decomposition. The reductant (e.g., urea) is injected into the exhaust gas stream before a mixer (e.g., a urea mixer) placed upstream of an SCR catalytic converter. The existing ammonia SCR technologies are considered an effective way to reduce diesel $NO_x$ emissions.

Existing SCR processes may require precise control of the reductant injection rate. Insufficient injection may reduce $NO_x$ conversion. An injection rate that is too high may waste reductant. The current dosing control system uses open-loop dosing maps, based on engine speed and load, with temperature modifiers to look up the required dosing quantity. A closed loop urea dosing system may be an improvement over the current open-loop dosing maps.

In a tested diesel aftertreatment system having a $NO_x$ storage (NS) catalyst separate from an SCR catalyst, a large temperature gap exists between a $NO_x$ release temperature from the $NO_x$ storage catalyst and a $NO_x$ reduction temperature over the SCR catalyst in Filter (SCRF). As a result, using a $NO_x$ storage catalyst as an example, 40% of stored $NO_x$ is released prematurely before the SCR catalyst reaches the active temperature for effective $NO_x$ reduction by ammonia ($NH_3$) generated by the injected urea solution.

Figure 1A:
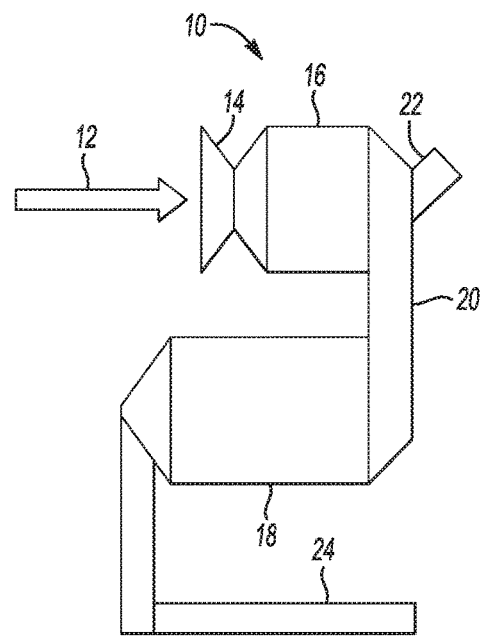
FIG. 1A is a schematic diagram of a tested diesel aftertreatment system.

FIG. 1A illustrates a schematic view of such a tested diesel aftertreatment system 10. Exhaust gas 12 from a diesel engine (not shown) enters a turbocharger 14 and then a $NO_x$ storage (NS) converter 16. Output gases from the NS converter 16 flow to a combined SCR catalyst and filter, also referred to herein as an SCR catalyst in Filter, or SCR in Filter (SCRF) 18 via a transfer tube 20. Urea, also called Diesel Exhaust Fluid (DEF) 22, is injected into the output gas stream in the transfer tube 20. The treated exhaust gas exits from the aftertreatment system 10 via tail-pipe 24.

In FIG. 1A, the NS converter 16 contains a $NO_x$ storage catalyst which also possesses the functionalities of a Diesel Oxidation Catalyst (DOC) for hydrocarbon (HC) and carbon monoxide (CO) oxidation. In the aftertreatment system 10, a majority of $NO_x$ is reduced to nitrogen gas, and diesel particulates are filtered out of the exhaust 12.

Close coupled with the turbocharger 14 of a diesel engine, the NS converter 16 passively stores $NO_x$ emissions until the $NO_x$ emissions are released at a higher temperature. The SCR portion of the SCRF (SCR in Filter) 18 reduces the released $NO_x$, using ammonia generated from the injected DEF 22, and the Filter portion of the SCRF 18 filters diesel particulates from the exhaust stream.

Figure 1B:
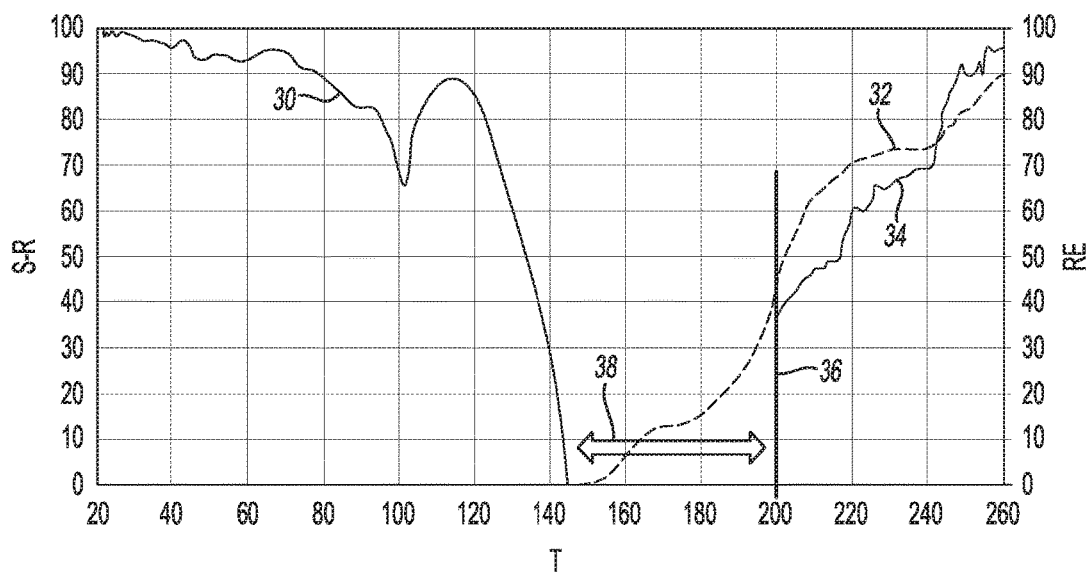
FIG. 1B is a plot, on coordinates of $NO_x$ storage and release efficiency (S-R, left, in percent) and $NO_x$ reduction efficiency (RE, right, in percent), both as a function of SCR inlet temperature (T, in ° C.), indicating a temperature gap between the start of $NO_x$ release, from a $NO_x$ storage catalyst, and the start of $NO_x$ reduction, over an SCR catalyst of the aftertreatment system depicted in FIG. 1A.

FIG. 1B is a graph showing the temperature gap between the start of $NO_x$ release from the NS converter 16, and the start of $NO_x$ reduction over the downstream SCR catalyst in the SCRF 18. The abscissa is SCRF inlet temperature ("T") in ° C. The left ordinate axis lists the $NO_x$ storage efficiency and release ("S-R") in percent. Curve 30 is the $NO_x$ storage portion, while Curve 32 is the $NO_x$ release portion. The right ordinate axis lists the SCRF $NO_x$ reduction efficiency ("RE") in percent. Curve 34 is the $NO_x$ reduction by the SCRF 18. It is noted that the $NO_x$ reduction by the SCRF 18 does not begin until the start of DEF 22 injection, indicated by the vertical line at 36. The start of DEF 22 injection does not typically begin until the SCRF inlet temperature has reached 200° C. This is to be compared with the start of $NO_x$ release at about 145° C. Thus, there is a gap 38 of some 55° C. between the start of $NO_x$ release from the NS converter 16 and the start of $NO_x$ reduction in the SCRF 18.

In accordance with the teachings herein, the cold-start $NO_x$ emission control is improved by significantly reducing the temperature gap between $NO_x$ release from the $NO_x$ storage catalyst and $NO_x$ reduction over the SCR catalyst. The reduction in the temperature gap is achieved by a dual-layer catalyst having a $NO_x$ storage catalyst coupled/ integrated with an ammonia SCR catalyst.

Examples of the dual-layer catalyst of the present disclosure may be for reducing $NO_x$ emissions from a diesel engine, particularly during a cold-start. An example of the dual-layer catalyst includes a substrate, a first layer disposed on the substrate and a second layer disposed on top of the first layer. The first layer includes a first catalyst for storing $NO_x$ when the first catalyst has a temperature below an active temperature of a second catalyst. The first catalyst is to release the stored $NO_x$ when the first catalyst is heated to the active temperature of the second catalyst. The second layer includes the second catalyst for Selective Catalytic Reduction of the released $NO_x$. The dual-layer catalyst is to be included in a catalytic converter and a catalyst system for reducing $NO_x$ emissions from a diesel engine, the $NO_x$ emissions including $NO_x$ emitted during a predetermined cold-start time period.

In an example, "cold-start" may refer to a period of time under conditions defined in 40 CFR § 86.137-90 (a) (2), included by reference herein in its entirety. As stated in 40 CFR § 86.137-90 (a) (2), the cold-start test is divided into two periods. The first period, representing the cold start "transient" phase, terminates at about 505 seconds of the driving schedule referred to in 40 CFR § 86.137-90. The second period, representing the "stabilized" phase, consists of the remainder of the cold-start driving schedule (including engine shutdown).

Examples of the dual-layer catalyst of the present disclosure may be achieved with a double catalyst washcoating of the two layers, with the ammonia SCR catalyst formed on top of the $NO_x$ storage (NS) catalyst.

FIG. 2A schematically depicts an example of a catalytic converter 40 according to the present disclosure. Exhaust gas 42 is introduced at the entrance of the catalytic converter 40; and treated exhaust gas 44 exits from the end of the catalytic converter 40 opposite the entrance. The catalytic converter 40 may be a flow-through or a wall-flow monolith. FIG. 2B is an enlargement of a cross-section of a portion of the interior wall 46 of the catalytic converter 40, schematically depicting an example of the dual-layer catalyst 50 of the present disclosure. A layer 54 of the NS catalyst is formed on a monolith substrate 52. A layer 56 of the ammonia SCR catalyst is formed on the NS catalyst layer 54.

The monolith substrate 52 may be any material suitable for a diesel emissions control catalyst, examples of which include cordierite or a metallic alloy (e.g., stainless steel containing Cr, Al or Ti), and combinations thereof.

The NS catalyst in layer 54, also referred to herein as a $NO_x$ adsorber, is an adsorbent such as a zeolite-containing adsorbent catalyst that traps the NO and $NO_2$ molecules at lower temperatures, acting as a molecular sponge. Once the trap is full (like a sponge full of water), no more $NO_x$ can be absorbed. The $NO_x$ storage capacity of the NS catalyst layer 54 is a function of temperature. As the NS catalyst is heated up to its $NO_x$ release temperature, the NO and $NO_2$ molecules will be thermally desorbed. In examples of the present disclosure, the material for the NS catalyst of layer 54 may be a composite catalyst chosen from any of Pd/zeolite, Pd/Fe/zeolite, Pd/Cu/zeolite, Pd/Cr/zeolite, Pd/Mn/zeolite, $Pd/CeO_2$, $Pd/CeZrO_x$, $Ag/Al_2O_3$, and the like.

In examples of the present disclosure, the ammonia SCR catalyst of layer 56 may be a zeolite-based catalyst, such as, e.g., copper-exchanged zeolite (Cu—Z) or iron-exchanged zeolite (Fe—Z). In other examples, the ammonia SCR catalyst of layer 56 may be made of a support component and an active catalytic component dispersed on oxide support materials. The support component can include titanium oxide, silicon oxide, or aluminum oxide. The active catalytic component may be an oxide of a base metal, such as vanadium oxide, molybdenum oxide, or tungsten oxide. The ammonia SCR catalyst of layer 56 is porous, to permit the exhaust gases to access the NS catalyst layer 54 for storage (and release) of $NO_x$ in/from the NS catalyst layer 54.

Without being bound to any theory, it is believed that in order for the dual-layer catalyst 50 to function with highest efficiency for $NO_x$ reduction, the NS catalyst layer 54 and the ammonia SCR catalyst layer 56 should have matching mass transport (pore diffusivity). However, to achieve a particular level of $NO_x$ reduction while accounting for manufacturing variation, in an example, a predetermined amount of excess capacity (one example of which may be from about 1 percent to about 5 percent) in the ammonia SCR catalyst layer 56 may be included. For example, if desired, the ammonia SCR catalyst layer 56 may have capacity to handle the $NO_x$ released from the NS catalyst layer 54 plus a predetermined amount. If the diffusivities of the two layers 54, 56 are not equal or about equal, the $NO_x$ reduction performance may be deleteriously affected in some instances.

In an example, the pore size distribution of each of the NS catalyst layer 54 and the ammonia SCR catalyst layer 56 is sufficient to allow gas pore diffusivity in the range of about $1\times10^{-7}$ m$^2$/s to about $9\times10^{-5}$ m$^2$/s. In a further example, the pore size distribution of each of the NS catalyst layer 54 and the ammonia SCR catalyst layer 56 is sufficient to allow gas pore diffusivity in the range of about $2\times10^{-7}$ m$^2$/s to about $5\times10^{-5}$ m$^2$/s. In yet a further example, the pore size distribution of each of the NS catalyst layer 54 and the ammonia SCR catalyst layer 56 is sufficient to allow gas pore diffusivity in the range of about $1\times10^{-6}$ m$^2$/s to about $1\times10^{-5}$ m$^2$/s.

The NS catalyst layer 54 and the ammonia SCR catalyst layer 56 may be applied sequentially onto the monolith substrate 52 by any suitable method. In an example, the NS catalyst layer 54 and the ammonia SCR catalyst layer 56 are sequentially applied by multiple washcoating (e.g., dual washcoating). Depending on the type of a given substrate 52, suitable NS catalyst layer 54 and ammonia SCR catalyst layer 56 thicknesses are sufficient to maintain a predetermined pressure drop in order to control engine back pressure.

In an example, the thickness of each of the NS catalyst layer 54 and the ammonia SCR catalyst layer 56, individually, ranges from about 5 micrometers to about 150 micrometers. In a further example, the thickness of each of the NS catalyst layer 54 and the ammonia SCR catalyst layer 56, individually, ranges from about 20 micrometers to about 100 micrometers. It is to be understood that the thickness of the NS catalyst layer 54 may be the same as, or different from the thickness of the ammonia SCR catalyst layer 56.

FIG. 3A schematically illustrates an example of a two-converter system 60 of the present disclosure. In the system 60, the exhaust gas 42 from a diesel engine 58 enters a first converter, which is a Diesel Oxidation Catalyst (DOC) converter 72. Exhaust 74 exits the DOC converter 72 and enters an ammonia SCRF converter 76 including the dual-layer catalyst 50. It is to be understood that all examples of the ammonia SCRF converter 76 of the present disclosure are distinguished from the SCRF 18 described above with regard to FIG. 1A. The ammonia SCRF converter 76 of the present disclosure includes an example of the dual-layer catalyst 50; whereas the SCRF 18 of FIG. 1A does not have the dual-layer catalyst 50. Following treatment in the ammonia SCRF converter 76, the treated exhaust gas 78 exits the system.

The SCRF in the SCRF converter 76 may be formed by depositing the SCR washcoat within the walls of a high porosity particulate filter substrate (e.g., a Diesel Particulate Filter (DPF) converter). As employed herein, the SCR converter and DPF converter may be combined to make an ammonia SCRF converter 76 (see, e.g., FIGS. 3A-3C), or may be separate (see, e.g., FIGS. 3D-3E).

FIGS. 3B-3E schematically depict further examples of diesel aftertreatment systems 160, 260, 360, 460, employing examples of the dual-layer catalyst 50. Each of the diesel aftertreatment systems 160, 260, 360, 460 has a plurality of catalytic converters, in which the first converter is a DOC converter 72.

In the example of the diesel aftertreatment system 160 depicted in FIG. 3B, the exhaust gas 74 from the DOC converter 72 enters an ammonia SCR converter 80, which contains a first instance of the dual-layer catalyst 50. It is to be understood that all examples of the ammonia SCR converter 80 of the present disclosure include an example of the dual-layer catalyst 50. The treated exhaust 178 from the ammonia SCR converter 80 enters the ammonia SCRF converter 76, which contains a second instance of the dual-layer catalyst 50. The treated exhaust 186 from the ammonia SCRF converter 76 exits the tail-pipe (not shown).

In the example of the diesel aftertreatment system 260 depicted in FIG. 3C, the ammonia SCR converter 80 is downstream of the ammonia SCRF converter 76. In FIG. 3C, treated exhaust 78 from the ammonia SCRF converter 76 enters the ammonia SCR converter 80. Treated exhaust 286 from the ammonia SCR converter 80 exits the tail-pipe (not shown).

In the example of the diesel aftertreatment system 360 depicted in FIG. 3D, the second converter is a DPF converter 88, while the third converter is the ammonia SCR converter 80 with a dual-layer catalyst 50. Treated exhaust 378 from the DPF converter 88 enters the ammonia SCR converter 80. Treated exhaust 386 from the ammonia SCR converter 80 exits the tail-pipe (not shown).

In the example of the diesel aftertreatment system 460 depicted in FIG. 3E, the DPF converter 88 is downstream of the ammonia SCR converter 80. In FIG. 3E, treated exhaust 478 from the ammonia SCR converter 80 enters the DPF converter 88. Treated exhaust 486 from the DPF converter 88 exits the tail-pipe (not shown).

Figure 4:
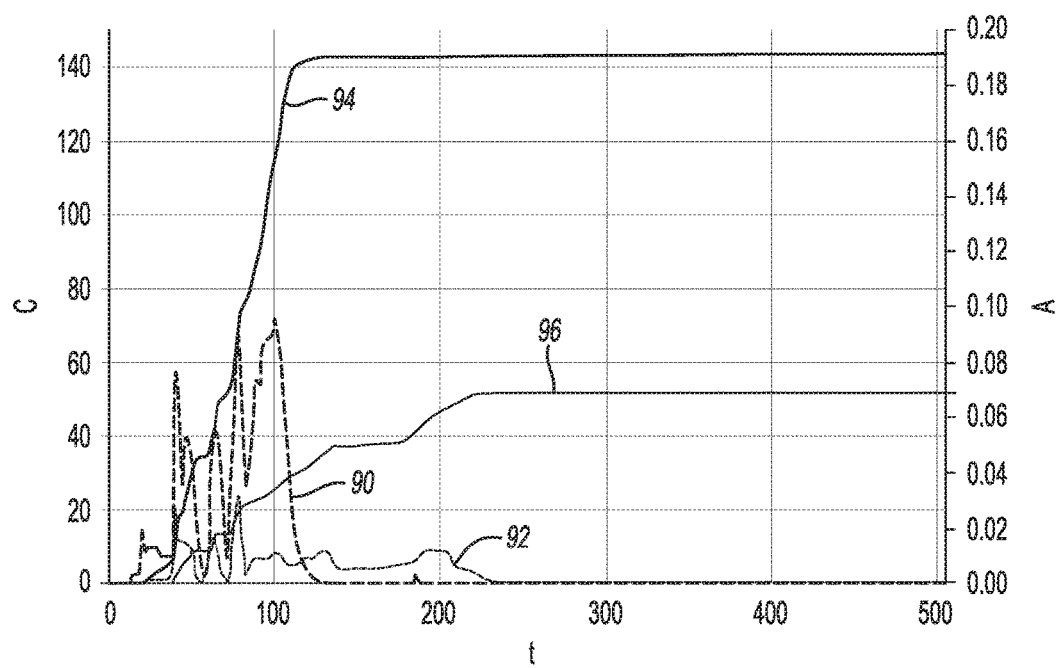
FIG. 4, is a plot, on coordinates of $NO_x$ concentration (C, left, in ppm) and accumulated $NO_x$ mass (A, right, in g), both as a function of time (t, in seconds), comparing the $NO_x$ emissions from the tested system shown in FIG. 1A with emissions from an aftertreatment system including an example of the dual-layer catalyst according to the present disclosure.

Some of the benefits of an example of the dual-layer catalyst disclosed herein are shown in FIG. 4, which is a plot of tail-pipe NO$_x$ concentration in parts per million (ppm; "C") (left ordinate) and accumulated tail-pipe NO$_x$ in grams (g; "A") (right ordinate), both as a function of time in seconds ("t"). The plot is based on a comparison of NO$_x$ emissions during a cold-start FTP75 test, where FTP75 refers to United States Environmental Protection Agency Federal Test Procedure 75 as updated in 2008.

Curve 90 denotes the NO$_x$ concentration of the tested exhaust aftertreatment (AT) system, shown in FIG. 1A, measured at the tail-pipe, while Curve 92 denotes the simulated NO$_x$ concentration of an example AT system (shown in FIG. 3A) including an example of the dual-layer catalyst 50 disclosed herein, measured at the tail-pipe, both with reference to the left ordinate. Curve 94 denotes the accumulated NO$_x$ of the tested AT system, shown in FIG. 1A, measured at the tail-pipe, while Curve 96 denotes the simulated accumulated NO$_x$ of an example AT system (shown in FIG. 3A) including an example of the dual-layer catalyst 50 disclosed herein, measured at the tail-pipe, both with reference to the right ordinate.

The results of the simulation of the system of FIG. 3A with the dual-layer catalyst 50 of the present disclosure as depicted in FIG. 4 clearly demonstrate the advantage of the dual-layer catalyst 50 for cold-start NO$_x$ emission control, as disclosed herein. This dual-layer catalyst will also provide an additional benefit of effective ammonia (NH$_3$) slip control. "Ammonia slip" is a term for describing ammonia passing through the SCR catalyst un-reacted.

The discussion of the SCR converter has been presented above, in some examples, in terms of urea as the reductant that is injected into the exhaust system for reaction with the SCR converter to reduce NO$_x$ to nitrogen and water. However, other reductants, such as anhydrous ammonia and aqueous ammonia, may also be used in lieu of the DEF (aqueous urea solution). If urea is used, the reduction reaction also produces carbon dioxide.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of from about 5 micrometers to about 150 micrometers should be interpreted to include not only the explicitly recited limits of from about 5 micrometers to about 150 micrometers, but also to include individual values, such as 12 micrometers, 50.7 micrometers, etc., and sub-ranges, such as from about 40 micrometers to about 80 micrometers, etc. Furthermore, when "about" is utilized to describe a value, this is meant to encompass minor variations (up to +/−10 percent) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A catalyst system for treating exhaust gases from a diesel engine, the catalyst system comprising:
    a Diesel Oxidation Catalyst (DOC) converter; and
    an ammonia SCR catalyst in Filter (SCRF) converter including a dual-layer catalyst disposed downstream from the DOC converter in an exhaust gas aftertreatment system, the dual-layer catalyst including:
    a substrate;
        a first layer disposed on the substrate and comprising a first catalyst to store $NO_x$ when the first catalyst has a temperature below an active temperature of a second catalyst, the first catalyst to release the stored $NO_x$ when the first catalyst is heated to the active temperature of the second catalyst; and
        a second layer disposed on the first layer and comprising the second catalyst, the second catalyst for ammonia Selective Catalytic Reduction (SCR) of the released $NO_x$, wherein the dual-layer catalyst is to be included in a catalytic converter for reducing $NO_x$ emissions from the diesel engine, the $NO_x$ emissions including $NO_x$ emitted during a predetermined cold-start time period.

2. The catalyst system as defined in claim 1 wherein the substrate of the dual-layer catalyst comprises a material selected from the group consisting of cordierite or a metallic alloy.

3. The catalyst system as defined in claim 1 wherein the first catalyst of the dual-layer catalyst is an adsorbent catalyst to trap NO and $NO_2$ molecules.

4. The catalyst system as defined in claim 3 wherein, the adsorbent catalyst is a composite catalyst selected from the group consisting of: Pd/zeolite, Pd/Fe/zeolite, Pd/Cu/zeolite, Pd/Cr/zeolite, Pd/Mn/zeolite, Pd/$CeO_2$, Pd/$CeZrO_x$, and Ag/$Al_2O_3$.

5. The catalyst system as defined in claim 1 wherein the second catalyst of the dual-layer catalyst comprises a support and an active catalytic component dispersed on the support.

6. The catalyst system as defined in claim 5 wherein the support comprises a material selected from group consisting of titanium oxide, silicon oxide, and aluminum oxide, and wherein the active catalytic component is an oxide of a base metal selected from the group consisting of vanadium, molybdenum, and tungsten.

7. The catalyst system as defined in claim 1 wherein the second catalyst of the dual-layer catalyst comprises a zeolite-based ammonia SCR catalyst selected from the group consisting of iron-exchanged zeolite, and copper-exchanged zeolite.

8. The catalyst system as defined in claim 1 wherein the first layer of the dual-layer catalyst has a first gas pore diffusivity and the second layer has a second gas pore diffusivity, and wherein the first gas pore diffusivity matches the second gas pore diffusivity.

9. The catalyst system as defined in claim 8 wherein each of the first and the second gas pore diffusivities ranges from about $1 \times 10^{-7}$ $m^2/s$ to about $9 \times 10^{-5}$ $m^2/s$.

10. The catalyst system as defined in claim 1 wherein the first layer of the dual-layer catalyst has a first gas pore diffusivity and the second layer has a second gas pore diffusivity, each of the first and the second gas pore diffusivities ranging from about $1 \times 10^{-7}$ $m^2/s$ to about $9 \times 10^{-5}$ $m^2/s$.

11. The catalyst system as defined in claim 1 wherein the first layer of the dual-layer catalyst has a first gas pore diffusivity and the second layer has a second gas pore diffusivity, each of the first and the second gas pore diffusivities ranging from about $2 \times 10^{-7}$ $m^2/s$ to about $5 \times 10^{-5}$ $m^2/s$.

12. The catalyst system as defined in claim 1 wherein the first layer of the dual-layer catalyst ranges in thickness from about 5 micrometers to about 150 micrometers, and wherein the second layer ranges in thickness from about 5 micrometers to about 150 micrometers.

13. The catalyst system as defined in claim 1 wherein the first layer of the dual-layer catalyst ranges in thickness from about 20 micrometers to about 100 micrometers, and wherein the second layer ranges in thickness from about 20 micrometers to about 100 micrometers.

14. The catalyst system as defined in claim 1, further comprising an ammonia SCR converter comprising the dual-layer catalyst that comprises the substrate, the first layer and the second layer, the ammonia SCR converter being disposed downstream from the DOC converter and upstream of the SCRF converter in the exhaust gas aftertreatment system.

15. The catalyst system as defined in claim 1, further comprising an ammonia SCR converter comprising the dual-layer catalyst that comprises the substrate, the first layer and the second layer, the ammonia SCR converter being disposed downstream from the DOC converter and downstream of the SCRF converter in the exhaust gas aftertreatment system.

16. A method of fabricating a catalyst system for treating exhaust gases from a diesel engine, including:
    fabricating an ammonia SCR catalyst in Filter (SCRF) converter including a dual layer catalyst by:
        forming a first layer on a substrate, the first layer comprising a first catalyst to store $NO_x$ when the first catalyst has a temperature below an active temperature of a second catalyst, the first catalyst to release the stored $NO_x$ when the first catalyst is heated to the active temperature of the second catalyst; and
        forming a second layer on the first layer, the second layer comprising the second catalyst, the second catalyst for Selective Catalytic Reduction (SCR) of the released $NO_x$ using ammonia, wherein the dual-layer catalyst is to reduce $NO_x$ emissions from the diesel engine, the $NO_x$ emissions including $NO_x$ emitted during a predetermined cold-start time period; and disposing the SCRF converter downstream from a Diesel Oxidation Catalyst (DOC) converter in an exhaust gas aftertreatment system.

17. The method as defined in claim 16 wherein the first layer and the second layer are formed by a dual washcoat process.

\* \* \* \* \*